United States Patent
Chaudhary et al.

(10) Patent No.: US 12,007,848 B2
(45) Date of Patent: Jun. 11, 2024

(54) AUTOMATIC SELECTION OF NETWORK PATH CONNECTING BACKUP CLIENTS TO A POOL OF MULTIPLE BACKUP STORAGE APPLIANCES

(71) Applicant: EMC IP Holding Company LLC, Hopkinton, MA (US)

(72) Inventors: Vikas Chaudhary, Pune (IN); Sirisha Kaipa, Cupertino, CA (US); Donna Barry Lewis, Holly Springs, CA (US); Viral Mehta, Pune (IN); Madhura Srinivasa Raghavan, Milpitas, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

(21) Appl. No.: 17/377,038

(22) Filed: Jul. 15, 2021

(65) Prior Publication Data
US 2023/0020458 A1   Jan. 19, 2023

(51) Int. Cl.
    G06F 11/14   (2006.01)
(52) U.S. Cl.
    CPC ............... G06F 11/1464 (2013.01)
(58) Field of Classification Search
    CPC .................................................. G06F 11/1464
    See application file for complete search history.

(56) References Cited

U.S. PATENT DOCUMENTS

| | | | |
|---|---|---|---|
| 10,178,032 B1* | 1/2019 | Freitas | H04L 47/125 |
| 2004/0095930 A1* | 5/2004 | Bennett | H04L 43/50 370/389 |
| 2005/0198335 A1* | 9/2005 | Brown | H04L 67/1014 709/229 |
| 2012/0297089 A1* | 11/2012 | Carothers | H04L 61/2514 709/245 |
| 2018/0132174 A1* | 5/2018 | Strong | H04L 45/00 |
| 2019/0045357 A1* | 2/2019 | Cooper | H04W 28/088 |
| 2022/0191151 A1* | 6/2022 | Klosterman | H04L 47/762 |

* cited by examiner

Primary Examiner — Mark D Featherstone
Assistant Examiner — Tony Wu
(74) Attorney, Agent, or Firm — Staniford Tomita LLP

(57) ABSTRACT

Information is stored that maps storage units to a pool of data protection appliances on which the storage units reside. The stored information includes a set of Internet Protocol (IP) addresses through which each data protection appliance can be reached. A connection request is received from a client. The connection request includes an identification of a particular storage unit which the client seeks to access for a data protection job. The particular storage unit is looked up in the stored information to identify a particular data protection appliance on which the particular storage unit currently resides. A list of multiple IP addresses through which the particular data protection appliance can be reached according to the stored information is returned to the client. The client, upon receipt of the list, selects an IP address from the list to attempt an initial connection to the particular data protection appliance.

20 Claims, 10 Drawing Sheets

US 12,007,848 B2

AUTOMATIC SELECTION OF NETWORK PATH CONNECTING BACKUP CLIENTS TO A POOL OF MULTIPLE BACKUP STORAGE APPLIANCES

TECHNICAL FIELD

The present invention relates generally to information processing systems, and more particularly to backup systems.

BACKGROUND

It is important to conduct regular backups and other data protection jobs. Backups, for example, may be performed by copying data from a client over a network to a remote backup storage appliance. The storage appliance may reside in a data center. A data center may contain multiple networks through which a storage appliance can be reached. It is generally desirable that any data protection job be completed as quickly and efficiently as possible.

Typically, the process to select a particular network is a manual step that is performed during an initial configuration of a backup job. This can be extremely burdensome especially when there are multiple storage appliances to manage. Network traffic can be dynamic and different networks can have different levels of activity at different times. It can be difficult to achieve good balancing with a manual approach.

Thus, there is a need for improved systems and techniques to automate the selection of a network path connecting backup clients to backup storage appliances.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
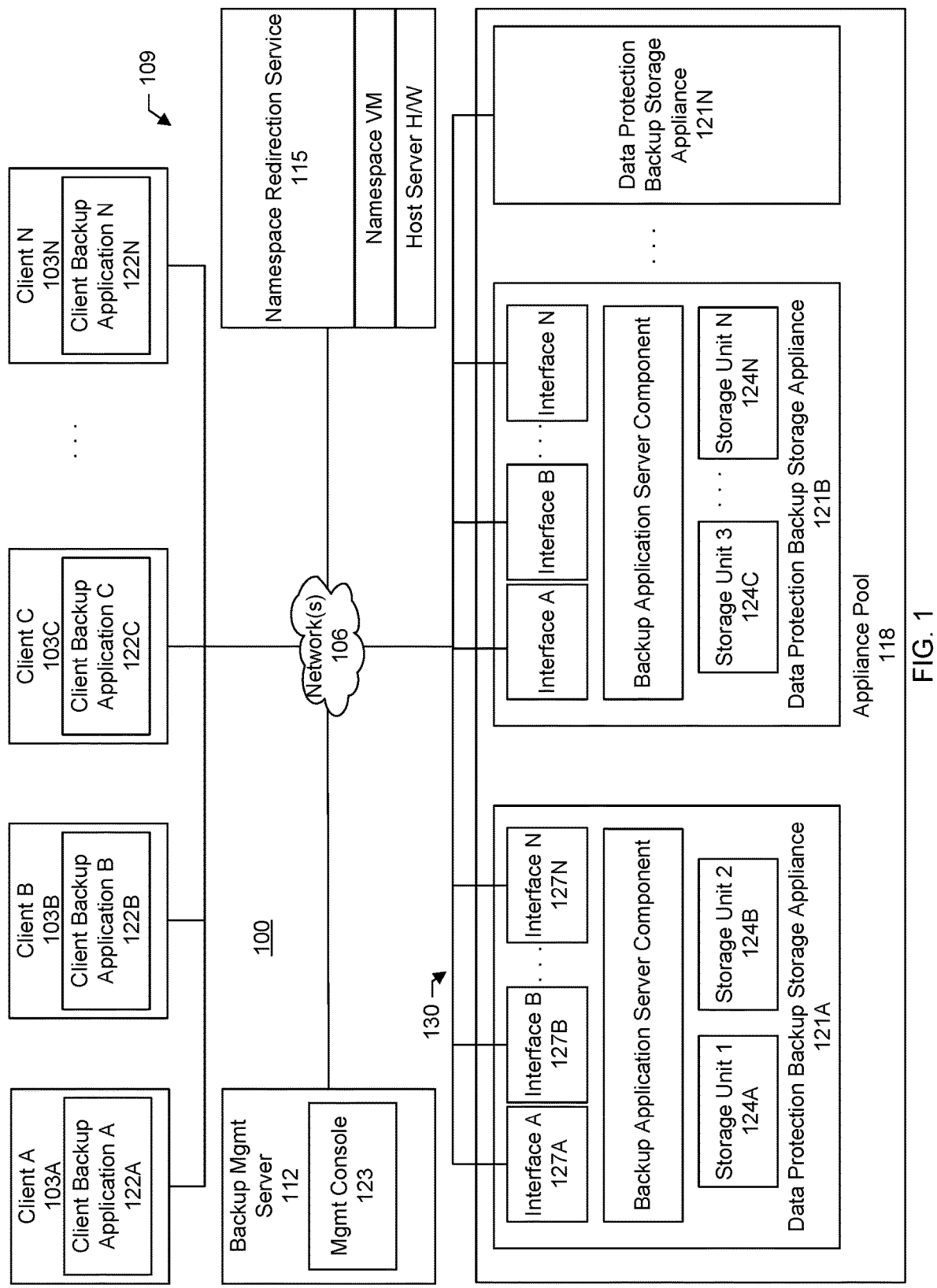
FIG. 1 shows a block diagram of an information processing system for making an automatic path selection for data protection jobs, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a simplified block diagram of an information processing system 100 within which methods and systems for making automatic path selections when connecting clients to a pool of backup storage appliances may be implemented. The selected paths allow for achieving improved or maximum bandwidth for conducting data protection jobs such as backups, restorations, or replications. In the example shown in FIG. 1, there are a set of clients 103A-N connected via one or more networks 106 to a backup system 109. The backup system includes a backup management server 112, namespace redirection service or server 115 (NRS), and an appliance pool 118 having multiple (e.g., two or more) data protection backup storage appliances 121A-N.

The backup management server is responsible for the overall management and configuration of the data protection jobs. In an embodiment, the backup management server coordinates with client backup applications 122A-N on the respective clients to conduct data protection jobs. For example, the backup management server may maintain a schedule indicating when backups are to be performed. When a time for backup has arrived, the backup management server may issue a command to a client to begin a backup job. The backup management server may include a management console 123 through which the backup system may be configured and services deployed.

The clients may include servers, desktop computers, laptops, tablets, smartphones, internet of things (IoT) devices, virtual machines (VMs), or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine representing virtual clients that may be supported by one or more servers within each VM, or other type of centralized network server.

The data generated or sourced by system 100 may be stored in any number of persistent storage locations and devices, such as within storage devices of the appliance pool, which may at least be partially implemented through storage device arrays, such as RAID components. In an embodiment, the network may be implemented to provide support for various storage architectures such as storage area network (SAN), Network-attached Storage (NAS), or Direct-attached Storage (DAS) that make use of large-scale network accessible storage devices, such as large capacity disk (optical or magnetic) arrays. In an embodiment, the target storage devices, such as a disk array may represent any practical storage device or set of devices, such as fiber-channel (FC) storage area network devices, and OST (OpenStorage) devices. The data source storage may be provided through a virtual machine or physical storage devices, and the target storage devices may represent disk-based targets implemented through virtual machine technology.

In an embodiment, system 100 may include a Data Domain™ Restorer (DDR)-based deduplication storage system as provided by Dell EMC of Dell EMC of Hopkinton, Massachusetts and Round Rock, Texas. The system may utilize certain protocol-specific namespaces that are the external interface to applications and include Network File System (NFS) and Common Internet File System (CIFS) namespaces, as well as Data Domain Boost (DDBoost) as provided by Dell EMC. In general, DDBoost is a system that distributes parts of the deduplication process to the backup server or application clients, enabling client-side deduplication for faster, more efficient backup and recovery. A data storage deployment may use any combination of these interfaces simultaneously to store and access data.

The clients, which may be referred to as DDBoost clients, may use the DDBoost backup protocol to conduct backups of client data to the appliance pool, restore the backups from the appliance pool to the clients, or perform other data protection operations. The DDBoost library exposes application programming interfaces (APIs) to integrate with a Data Domain system using an optimized transport mechanism. These API interfaces exported by the DDBoost Library provide mechanisms to access or manipulate the functionality of a Data Domain file system. Embodiments may utilize the DDBoost File System Plug-In (BoostFS), which resides on the application system and presents a standard file system mount point to the application. With direct access to a BoostFS mount point, the application can leverage the storage and network efficiencies of the DDBoost protocol for backup and recovery. Some specific embodiments are described in conjunction with storage systems, products, and services referred to as Data Domain as provided by Dell EMC. It should be appreciated, however, that the described systems and techniques can be applied to other similar storage systems, products, and services. For example, some specific embodiments are described in conjunction with the DDBoost protocol. Aspects and principles of embodiments described, however, are applicable to other protocols such as NFS, CIFS, and others.

The appliance pool can be a grouping of multiple storage appliances on which any number of storage units 124A-N reside. A storage unit may be referred to as a backup set. A storage unit is a logical container to group data including any number of files, directories, volumes, or objects that are to be protected by the backup system. In an embodiment, a storage unit corresponds to a directory within a file system of a storage appliance. A storage unit may be associated with attributes including a user authorized to access the storage unit, name or other identifier for the storage unit, optional storage quotas or limits specifying an amount of data that may be written to the storage unit, other attributes, or combinations of these. In an embodiment, there is at most a single user authorized to access or write to a storage unit. This helps to facilitate good security and ensure that backups are not accidentally overwritten. In other embodiments, there can be multiple users authorized to write to a storage unit.

Each storage appliance includes multiple access points, ports, links, or interfaces 127A-N that a client may connect to in order to conduct a data protection job, e.g., backing up or restoring a backup set. In particular, the storage pool may include any number of storage appliances on different networks and reachable through multiple Internet Protocol (IP) addresses or network paths 130. The storage pool provides customer users with a flexible and efficient way to manage, configure, and administer their storage and data protection needs.

The presence, however, of multiple storage appliances with each being reachable through multiple network interfaces or paths makes it very difficult to determine which particular path to use for a pending data protection job to achieve good efficiency and proper load balancing. For example, there can be multiple clients at any given time simultaneously accessing the same (or different) storage appliances of the appliance pool to read and write data, higher latencies or activity on some networks and lower latencies or activity on other networks, problems with particular network interfaces or network paths, and so forth. This makes it very difficult for the user to select an appropriate network interface or path during configuration as there can be many changes over time that can affect the speed of a particular network interface or path. Thus, in an embodiment, systems and techniques are provided for making an automatic path selection to achieve good or maximum bandwidth when conducting data protection jobs in an environment having multiple data protection or backup storage appliances. Such systems and techniques also allow for a good user experience when users configure their data protection jobs (e.g., backup jobs).

For example, a user rather than selecting a particular storage appliance on which a storage unit or backup set is to be created or deciding which network interface or path to be used by the backup jobs, can simply specify the appliance pool. The system, in turn, can select a storage appliance on which to create the storage unit and then transparently manage and track the location of the storage unit or backup set. The customer user or backup administrator does not have to manually track the locations, determine which backup set or storage unit belongs which storage appliance, or manually configure a network interface or decide on a network path for a data protection job.

Specifically, the namespace redirection service provides an abstraction layer by redirecting clients the appropriate storage appliance based on the storage unit or backup set object that a client wishes to access. In particular, the namespace redirection service tracks the locations of the storage units or backup sets including the storage appliances on which they currently reside. The namespace redirection service facilitates the selection of a particular network interface or network path associated with a particular storage appliance to use for a pending data protection job of a client to help ensure a good data transfer rate. Systems and techniques of the namespace redirection service help to ensure good load balancing on a storage appliance and, more specifically, that a particular network path of a storage appliance is not overburdened while another network path of the storage appliance is under-utilized. In an embodiment, the namespace redirection service is implemented as a microservice available through a virtual machine.

The namespace redirection service provides the clients or client backup applications with a central point of contact for their data protection jobs. With the location information returned from the namespace redirection service, a connection can be made to a data protection storage appliance on which a storage unit or backup set of interest currently resides using an appropriate network interface or network path associated with the storage appliance. The namespace redirection service allows for managing and connecting to an appliance pool having multiple storage appliances with multiple network interfaces without impacting the client users or applications. When a client needs to access a storage unit or backup set, the client can contact the namespace redirection service to obtain location information about the storage unit. The namespace redirection service facilitates routing the connection automatically to the storage appliance where the relevant storage unit of interest is present.

Figure 2:
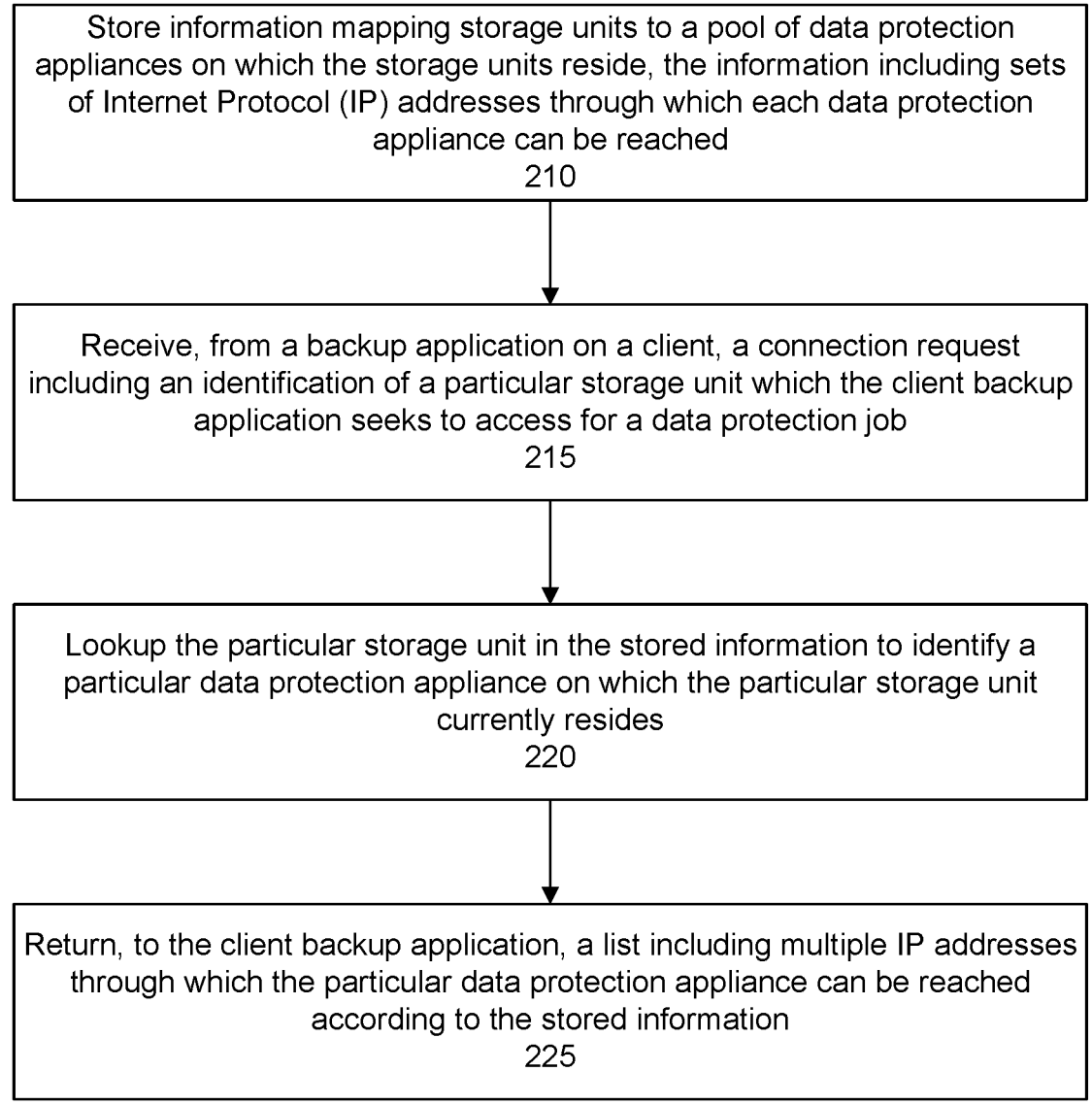
FIG. 2 shows an overall flow of a namespace redirection service from a server-side, according to one or more embodiments.

FIG. 2 shows an overall flow of the namespace redirection service. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, the namespace redirection service stores information mapping storage units to a pool of data protection storage appliances on which the storage units reside. The information includes sets of multiple IP addresses through which each data protection storage appliance can be reached. In an embodiment, the information is stored in a database. In other embodiments, the information may be stored in a file or any other competent data structure.

In a step 215, the namespace redirection service receives a connection request from a client or backup application on the client. The connection request includes an identification of a particular storage unit which the client backup application seeks to access for a data protection job.

In a step 220, the namespace redirection service performs a lookup into the stored mapping information (e.g., database) with the particular storage unit to identify a particular data protection storage appliance on which the particular storage unit currently resides.

In a step 225, the namespace redirection service returns to the client backup application a list having multiple IP addresses through which the particular data protection storage appliance can be reached according to the stored mapping information. The list of IP addresses correspond to the network interfaces or paths associated with the storage appliance and through which the client may to connect to the storage appliance. In an embodiment, the list of IP addresses includes multiple (e.g., two or more) IP addresses. For example, there can be two, three, four, five, or more than five IP addresses. The client, upon receiving the list of IP addresses, can select an IP address from the list to attempt an initial connection to the storage appliance.

Figure 3:
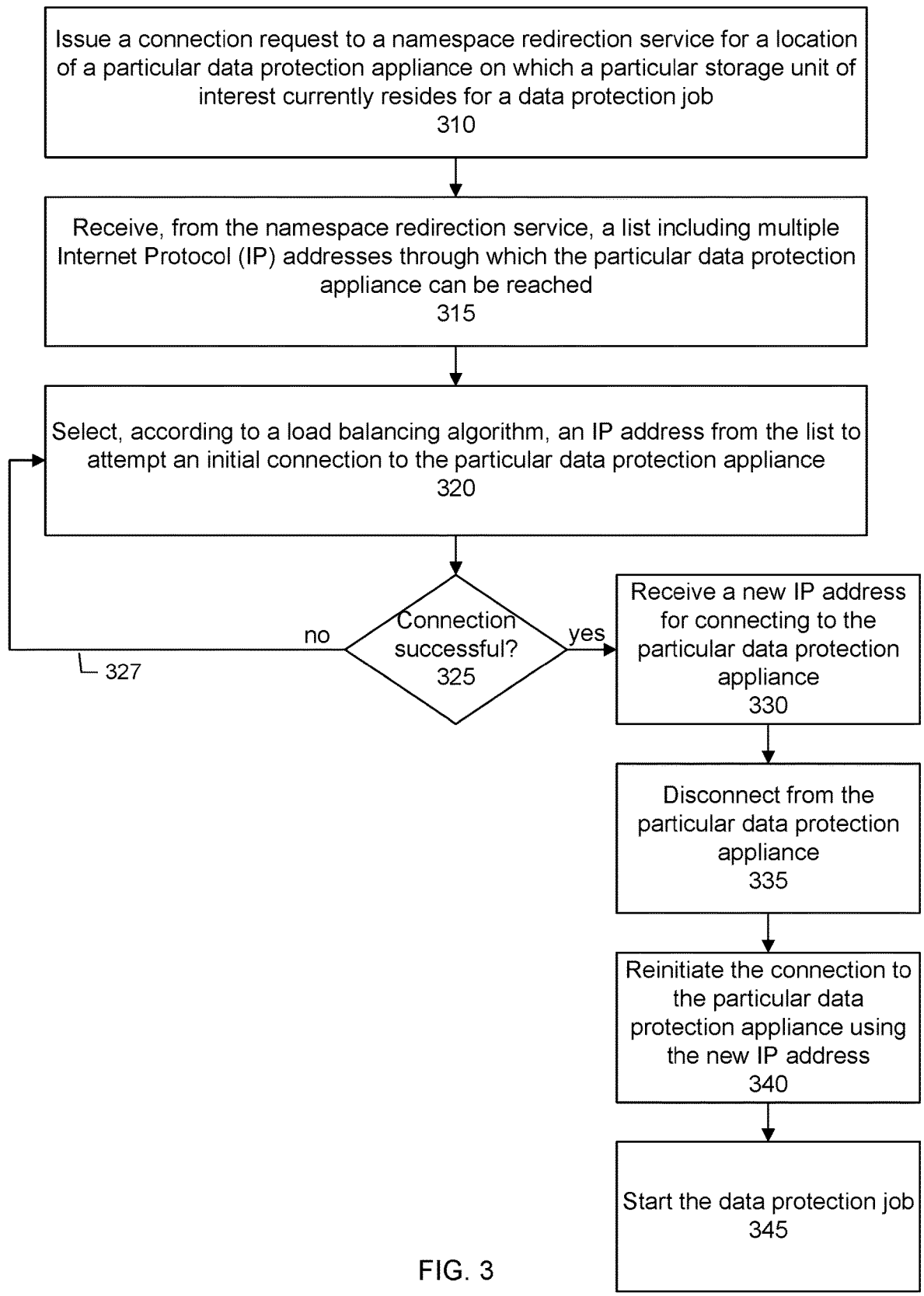
FIG. 3 shows an overall flow of the namespace redirection service from a client-side, according to one or more embodiments.

More particularly, FIG. 3 shows a flow of redirection service from a client side. In a step 310, a client or client backup application issues a connection request to a namespace redirection service for a location of a particular data protection storage appliance on which a particular storage unit of interest currently resides for a data protection job. In an embodiment, the connection request is issued as a remote procedure call (RPC).

In a step 315, the client backup application receives, from the namespace redirection service, a list including multiple IP addresses through which the particular data protection appliance can be reached according to the namespace redirection service. As discussed, the list of IP addresses includes multiple (e.g., two or more) IP addresses.

In a step 320, the client backup application selects, according to a load balancing algorithm, an IP address from the list to attempt an initial connection to the particular data protection storage appliance. In an embodiment, the load balancing algorithm relies on random selection to distribute load evenly. In other words, the selection of the IP address is made randomly or pseudo randomly.

In a step 325, a determination is made as to whether the initial connection attempt was successful (e.g., whether a response was received from the data protection storage appliance). If the attempt is unsuccessful, the process loops back 327 to make another selection of an IP address from the list of IP addresses to attempt another connection. The previously selected IP address that lead to the unsuccessful attempt may be marked or otherwise removed from consideration by the client for the particular pending data protection job. This helps to ensure that the previously selected IP address is not again selected for the next connection attempt. For example, the client may filter the list of IP addresses to remove the previously selected IP addresses and make another random selection of IP addresses from the filtered list of IP addresses not having the previously selected IP addresses. Alternatively, in the next attempt, the client may make another random selection of an IP address from the list and compare the selected IP address with the previously selected IP address. If there is a match, the client may continue to repeat the selection process until a non-matching IP address has been selected from the list of IP addresses and then reattempt the initial connection. The failure to connect using a particular IP address may be accompanied by an alert notification to the backup management server and ultimately the backup administrator user so that an investigation may be made into the failed connection.

If the connection attempt was successful, a further load balancing is performed to spread the client application's load across the network interfaces of the storage appliance. More specifically, in a step 330, the client application receives a new IP address for connecting to the particular data protection storage appliance. In a step 335, the client application disconnects from the storage appliance. In a step 340, the client application reinitiates the connection to the storage application using the new IP address. In a step 345, the data protection job is started.

In particular, in an embodiment, a module on the data protection appliances tracks usage and status of the various network interfaces. This allows for identifying a network interface having low activity relative to other network interfaces of the storage appliance when a connection request is received. The identified network interface can be designated as an optimal interface and provided to the client application. The client application can then disconnect from the initial network interface and reconnect using the designated network interface. In an embodiment, this technique of balancing over multiple network interfaces may be referred to as the Dynamic Interface Group (ifgroup) method. In an embodiment, at least a subset of multiple network interfaces of a storage appliance are grouped together to form a group or collection of initial network interfaces that may be referred to as an ifgroup. Further discussion of ifgroups is provided in U.S. Pat. No. 9,047,128 ('128 patent), issued Jun. 2, 2015, and is incorporated by reference along with all other references cited. Aspects of ifgroups discussed in the '128 patent may be used or combined with aspects discussed in this application.

Figure 4:
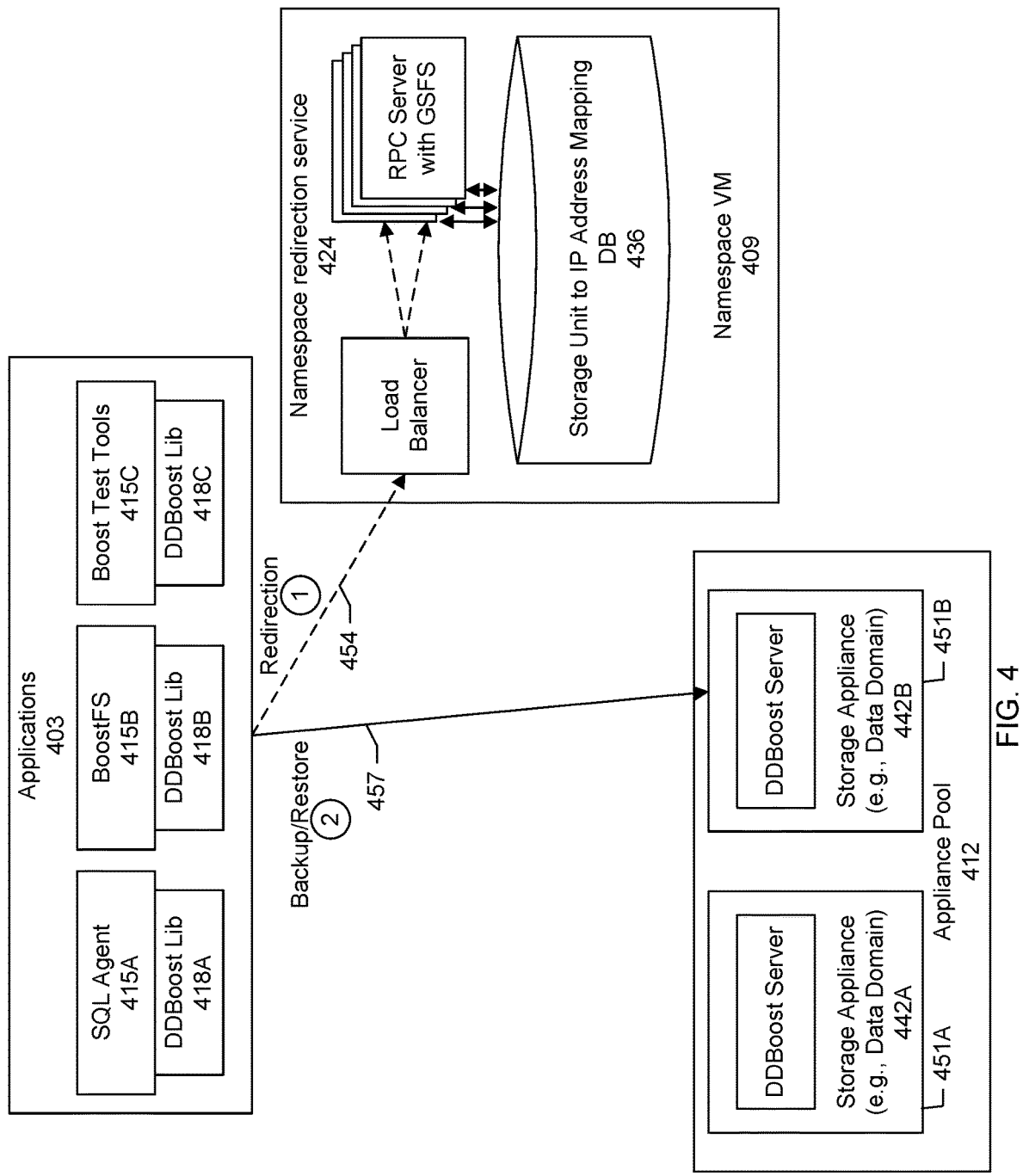
FIG. 4 shows an overview of a workflow of the namespace redirection service, according to one or more embodiments.

FIG. 4 shows a block diagram of a workflow overview of the namespace redirection service, according to one or more embodiments. As discussed, in an embodiment, the namespace redirection service is provided in connection with a Data Domain Restorer™ (DDR) storage system as by Dell EMC. In this embodiment, the storage system includes multiple Data Domain storage or Power Protect appliances. An environment having multiple data protection storage appliances and a namespace redirection service may be referred to as a Global Scale (GS) environment as provided by Dell EMC. Global Scale is a data management platform for multiple Power Protect appliances. In an embodiment, the Global Scale platform includes a Pseudo File System (PseudoFS or GSFS), that implements location information lookup operations for backup set objects. It should be appreciated, however, that the systems and techniques described herein may be known by any name or identifier. Aspects and principles of the Global Scale platform may be provided in any environment or platform having multiple storage appliances to manage.

The example shown in FIG. 4 includes applications 403, namespace virtual machine 409, and appliance pool 412. The applications include a SQL agent 415A (used to backup and restore Microsoft SQL Server), BoostFS 415B, and Boost Test Tools 415C, each of which access DDBoost libraries 418A-C, respectively, to conduct data protection jobs.

There are storage units 451A,B on appliances 442A,B. A storage unit to IP address mapping database 436 tracks the locations of the storage unit and, in particular, the storage appliances to which they currently belong along with other attributes associated with the storage unit (e.g., user credentials).

In a first step, when an application wishes to connect to a particular storage unit to initiate a backup job or other data protection job, the application first connects 454 to a namespace redirection service 424. The namespace redirection service, upon authenticating the connection request based on a credentials associated with the request, looks at the storage unit to IP address mapping database and returns a list of IP addresses that can be used to connect to the particular storage unit.

In a second step 457, the application selects an IP address from the list of IP addresses to establish a connection with the particular storage appliance having the particular storage unit. As discussed, the namespace redirection service provides a central point of contact for the application and redirects the data protection jobs to the appropriate storage appliance.

Figure 5:
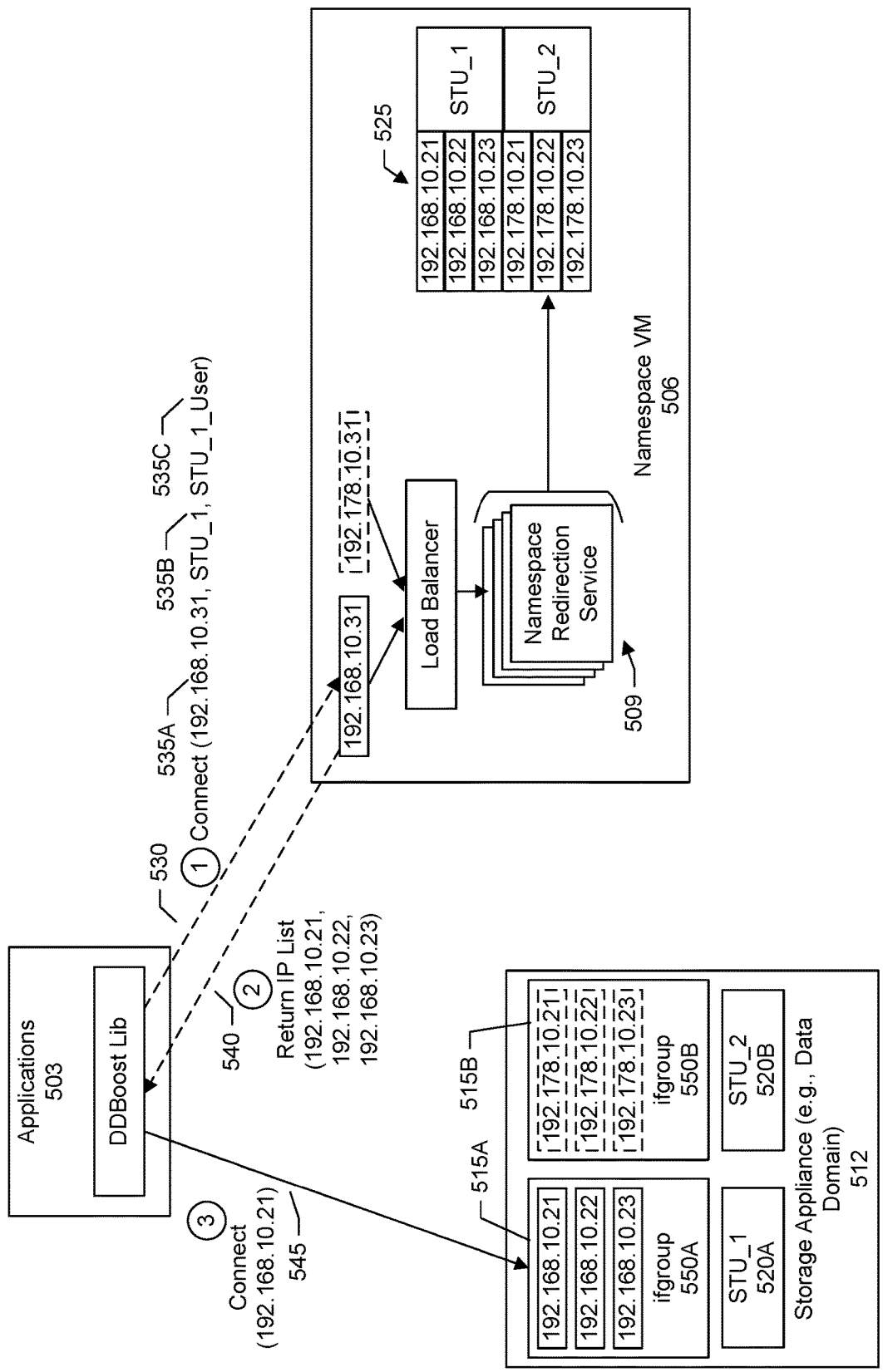
FIG. 5 shows a more detailed workflow of the namespace redirection service, according to one or more embodiments.

FIG. 5 shows another block diagram of the namespace redirection service for handling multiple networks that a storage appliance may be associated with. The example shown in FIG. 5 includes applications 503, a namespace virtual machine 506 hosting a namespace redirection service 509, and a storage appliance 512. The storage appliance is associated with first and second network subnets 515A,B, respectively. IP addresses of the first network subnet are shown in solid lines. IP addresses of the second network subnet are shown in broken lines. A first storage unit 520A on the storage appliance is associated with the first network subnet. A second storage unit 520B on the storage appliance is associated with the second network subnet. A storage unit to IP address mapping database 525 of the namespace redirection service tracks the locations of the storage unit and, more particularly, the IP addresses through which the storage appliances having the storage units can be reached.

In a first step 530, the application connects to the namespace redirection service by issuing a connection request to the namespace redirection server using an access IP address 535A, e.g., 192.168.10.31. The connection request further includes a name or identifier of a storage unit the application wishes to access (e.g., STU_1) 535B, and user associated with the storage unit (e.g., STU_1_user) 535C.

Upon receipt of the connection request, the namespace redirection service authenticates the user and consults the database to locate the specified storage unit and network group or, more particularly, IP addresses associated with the storage appliance to which the storage unit currently belongs. According to the database, first storage unit 1 is associated with a storage appliance belonging to the first network group and reachable through IP addresses 192.168.10.21, 192.168.10.22, and 192.168.10.23.

In a second step 540, the listing of IP addresses is returned to the application. The namespace redirection service may additionally include attributes or interface characteristics associated with each of the IP addresses. Such attributes may include link speed, interface type, bandwidth, maximum transmission unit (MTU) size, or any other attribute or combination of attributes (e.g., 10 Gb Ethernet network versus 1 Gb Ethernet network).

The application selects, according to a load balancing algorithm, an IP address from the list to connect to the storage appliance. In an embodiment, the selection is made randomly. Alternatively, the selection may be made using round robin load balancing or any other competent load balancing algorithm. In embodiments where the namespace redirection service returns additional attributes associated with the listing of IP addresses, the application may further evaluate and weigh the attributes when making the IP address selection for the initial connection.

In the example shown in FIG. 5, the IP address 192.168.10.21 has been selected from the listing of IP addresses returned by the namespace redirection service to the application. Thus, in a third step 545, the application attempts an initial connection to the storage appliance using the selected IP address, e.g., 192.168.10.21.

The interactions between the client applications and the namespace redirection service—including returning the list of IP addresses by the namespace redirection service to a client application and a random selection of an IP address from the list by the client application to establish an initial connection to a storage appliance—helps to facilitate a connection level balancing when there are multiple clients accessing the storage appliances of the appliance pool.

For example, there can be tens, hundreds, or even thousands of clients accessing the appliance pool. If multiple clients were to access the same interface at the same time, long delays and latencies may be experienced. The random or pseudo random selection of an IP address by the client applications helps to ensure an even distribution of load across the different network interfaces for the initial connections from multiple client applications. In other words, the technique helps to avoid a scenario where many or all clients are using the same network interface or path when making an initial connection to a storage appliance of the appliance pool.

The client application, rather than being given a single IP address to make an initial connection, is instead given multiple, e.g., two, three, four, five, or more than five IP addresses, from which to select. Providing the client with the responsibility for selecting an IP address from the list of IP addresses helps to reduce the amount of resources required on the server and reduces the need to further contact the namespace redirection service. For example, if the client encounters difficulty in connecting to the storage appliance using the IP address initially selected, the client can select another IP address from the list of IP addresses. The client does not have to contact the namespace redirection service for another IP address because the client has already been given multiple IP addresses with which to attempt the connection.

In an embodiment, interface groups or ifgroups 550A,B are created for the subnets. As discussed, when the application makes an initial connection to an IP address of an interface group, a determination is made as to how many read or write streams are currently active on each interface of the interface group. An IP address of an interface currently having the lowest number of active read or write streams is identified and returned to the application. The application, upon receiving the IP address, reinitiates a connection on the new IP address received from the interface group and then begins sending the actual data traffic for the data protection job using the new IP address. This helps to further load balance data traffic on the storage appliance.

Figure 6:
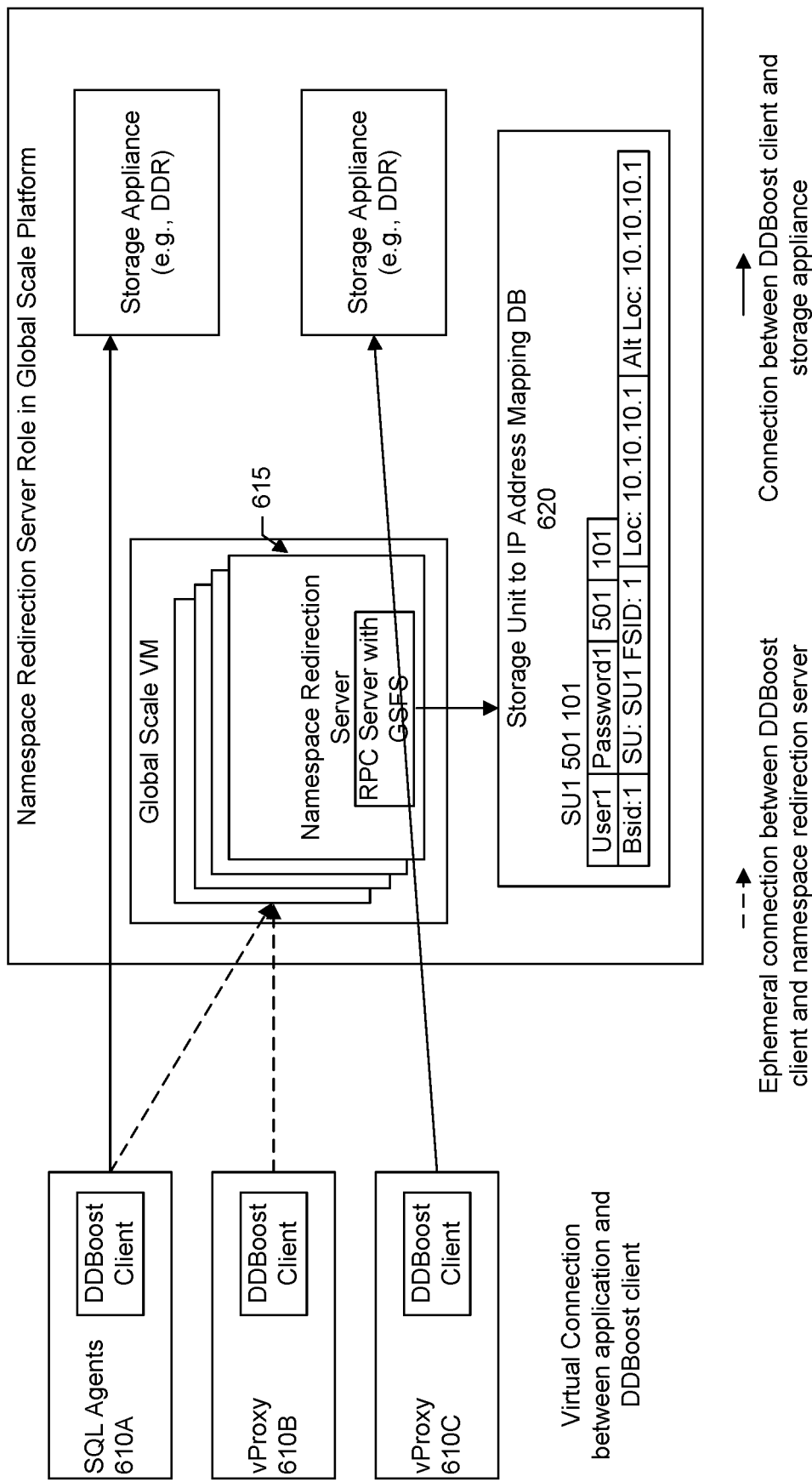
FIG. 6 shows another architecture diagram illustrating client applications interacting with the namespace redirection service, according to one or more embodiments.

FIG. 6 shows another architecture diagram illustrating client applications interacting with the namespace redirection service. In the example shown in FIG. 6, clients such as clients 610A-C (e.g., DDBoost clients) initially connect to a namespace redirection server 615 to obtain the location of the storage unit after the DDBoost connection is authenticated. In particular, the DDBoost client sends a remote procedure call (RPC) to retrieve backup set location information to the namespace redirection service server. Then the namespace redirection service server communicates with GSFS to obtain the location of the backup set object. The location information is stored in a storage unit to IP address mapping database 620.

Figure 7:
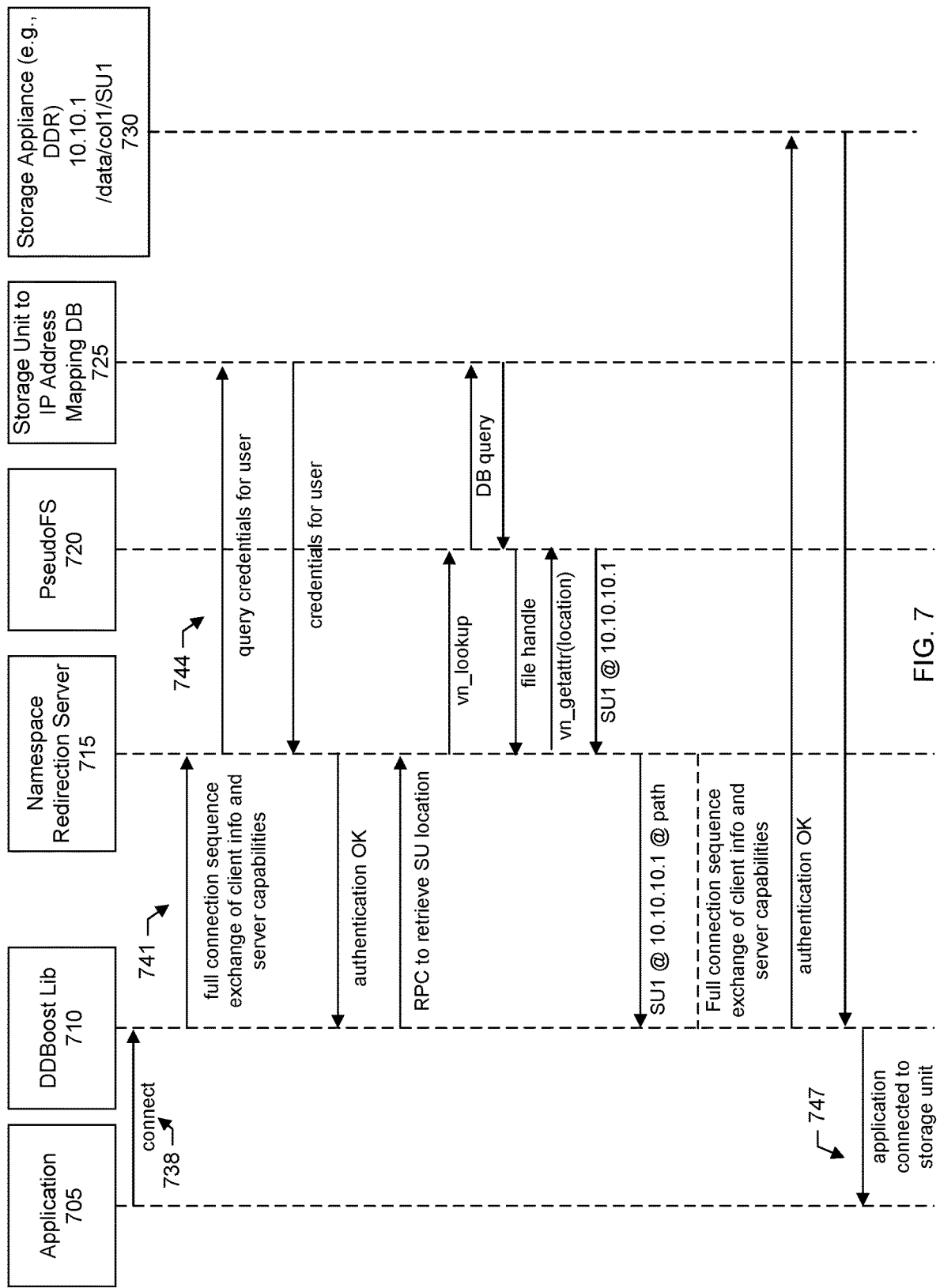
FIG. 7 shows a swimlane diagram for the namespace redirection service, according to one or more embodiments.

FIG. 7 shows a swimlane diagram of a process for making a connection to conduct a data protection operation. Actors in the process include an application 705, DDBoost library 710, namespace redirection server 715, pseudoFS 720, storage unit to IP address mapping database 725, and data storage appliance (e.g., DDR) 730. The application initiates 738 a request to connect and the DDBoost library issues 741 the request to the namespace redirection server. The namespace redirection server fetches 744 the credentials and list of IP addresses associated with the storage unit for which access is being requested. The list of IP address is returned to the application which then connects 747 to the storage unit.

In an embodiment, an RPC is implemented between a DDBoost client and the namespace redirection server to exchange communications about a location of a storage unit or backup set. The namespace redirection server can be microservice that is behind a load balancer such as a Docker Swarm Load Balancer or Kubernetes Load Balancer. The external IP address where the DDBoost client connects to may be different than what the namespace redirection server can internally have. A storage appliance (e.g., DDR) can be on several networks and there can be multiple distinct IP address paths to reach a DDR. Depending on backup set access restrictions and backup set availability via certain networks the namespace redirection server returns correct location information for backup set objects. In an embodiment, DDBoost clients pass an "Access IP" address in the RPC payload which namespace redirection service can later use to perform the lookups. The namespace redirection server returns multiple locations.

Figure 8:
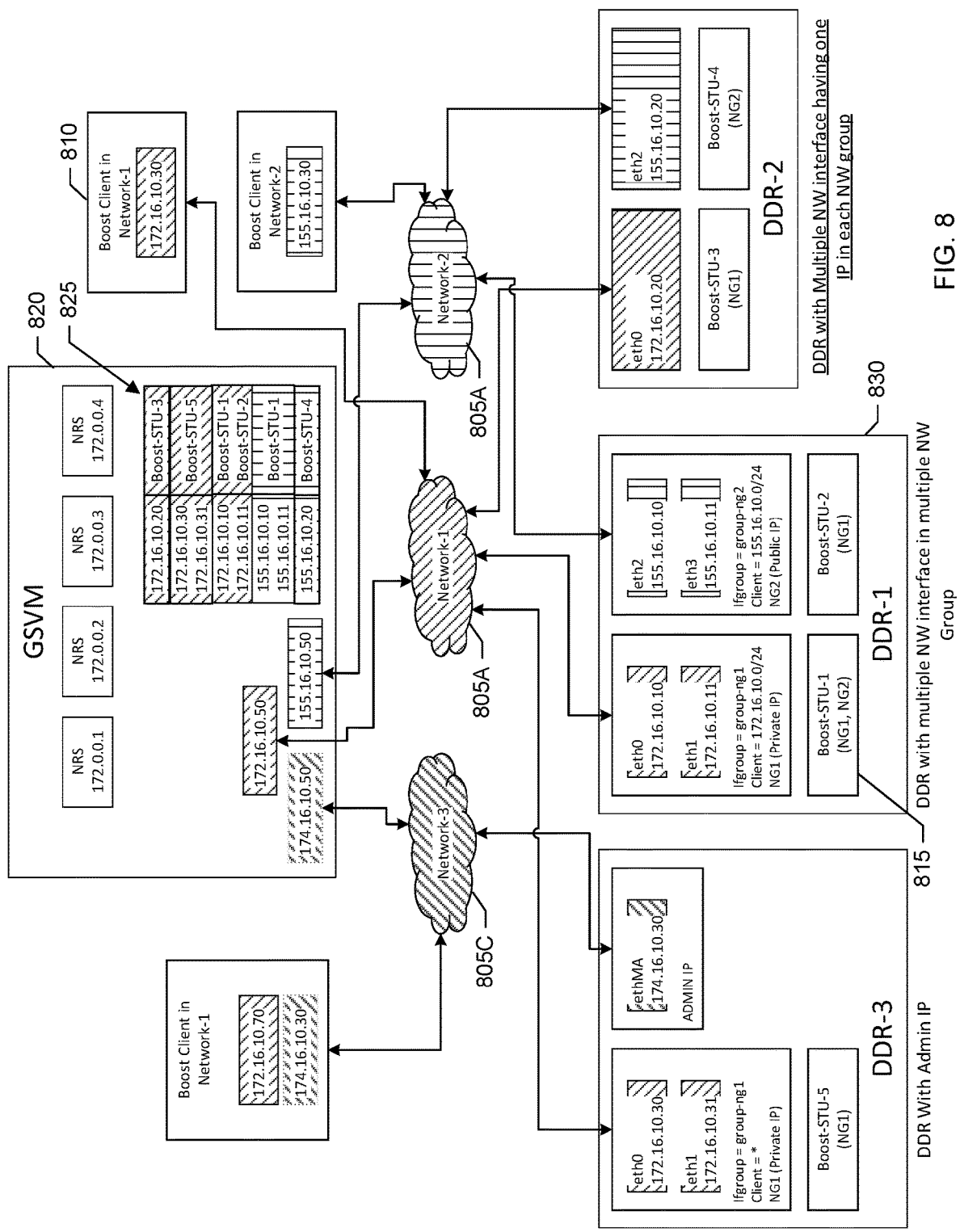
FIG. 8 shows a block diagram of deployment configuration for the namespace redirection service, according to one or more embodiments.

Referring now to FIG. 8, as an example, consider a client 810 in a first network 805A (as shown by a fill pattern of lines sloping to the left) that seeks to access a first storage unit (STU-1) 815. As discussed, the client contacts a namespace redirection server 820 to request access. The namespace redirection server, in turn, consults a location or, more particularly, storage unit to IP address mapping database 825 to identify a list of IP addresses through which the first storage unit can be accessed. In the example shown in FIG. 8, these IP addresses include 172.16.10.10 and 172.16.10.11. These IP addresses are returned to the client. The client selects an IP address from the list to attempt to connect with a storage appliance associated with the IP addresses, e.g., a first storage appliance 830. If the connection is not successful, the client can retry using a different IP address from the list of IP addresses returned to the client by the namespace redirection server.

That is, the namespace redirection server returns multiple locations (multiple IP addresses) to facilitate good or optimal load balancing. In an embodiment, there is an initial filtering where, based on the "Access IP" passed by the clients (e.g., DDBoost clients), the namespace redirection server can return a "list of IP addresses" which are relevant for a specific network partition. The namespace redirection server can also return any attributes such as link speed, type of interface, and so forth along with each location/IP address which can be discovered during an earlier phase.

As shown in the example of FIG. 8, if a DDBoost client is configured to have only access to a "172.16.10.XXX" network, it will pass the "access IP" of the same subnet and the namespace redirection server returns a list of IP addresses in the same subnet which are configured on a storage appliance (e.g., DDR) where the backup set is present.

In an embodiment, random selection for initial connection load balancing is performed. As discussed, a client (e.g., DDBoost client) obtains multiple locations for a storage unit or backup set from the namespace redirection server. For initial connection load balancing, DDBoost clients can select a single random location from the list of multiple locations. This helps to ensure that connection load balancing is achieved and a single interface does not become overloaded.

In an embodiment, data traffic load balancing is also provided. In this embodiment, a storage device (e.g., DDR) provides a dynamic interface group (Ifgroup) service to load balance data traffic across multiple ethernet ports. The same may be leveraged to achieve load balancing for backup/restore/MFR traffic. In an embodiment, while a storage (e.g., Data Domain) system is being added to a global scale or other multi-storage appliance environment, the service can lookup its networking information and can create ifgroups automatically such that for each "subnet" there is one ifgroup configured.

In an embodiment, a method includes storing information mapping storage units to a pool of data protection appliances on which the storage units reside, the stored information comprising a plurality of Internet Protocol (IP) addresses through which each data protection appliance can be reached; receiving, from a client, a connection request comprising an identification of a particular storage unit which the client seeks to access for a data protection job; looking up the particular storage unit in the stored information to identify a particular data protection appliance on which the particular storage unit currently resides; and returning, to the client, a list comprising multiple IP addresses through which the particular data protection appliance can be reached according to the stored information, wherein the client upon receipt of the list selects an IP address from the list to attempt an initial connection to the particular data protection appliance. In an embodiment, the selection of the IP address from the list by the client is a random selection. The storage unit may correspond to a directory within a file system of the data protection appliance.

In an embodiment, when the initial connection attempt is unsuccessful, the client repeats selecting an IP address from the list until the initial connection attempt is successful. In an embodiment, upon the initial connection attempt being successful, the client receives a new IP address from the data protection appliance, disconnects from initial connection using the selected IP address, reinitiates a connection to the data protection appliance with the new IP address, and starts the data protection job with the reinitiated connection.

In an embodiment, the method further includes returning, to the client, network attributes associated with each IP address in the list of IP addresses, the network attributes comprising a link speed and interface type associated with an IP address.

In an embodiment, the client is a first client and the method further comprises: receiving, from a second client, a second connection request comprising the identification of the particular storage unit which the second client seeks to access for another data protection job; looking up the particular storage unit in the stored information to identify the particular data protection appliance on which the particular storage unit currently resides; and returning to the second client, the list of IP addresses through which the particular data protection appliance can be reached according to the stored information, wherein the second client upon receipt of the list selects an IP address from the list to attempt an initial connection to the particular data protection appliance.

In another embodiment, there is a system comprising: a processor; and memory configured to store one or more sequences of instructions which, when executed by the processor, cause the processor to carry out the steps of: storing information mapping storage units to a pool of data protection appliances on which the storage units reside, the stored information comprising a plurality of Internet Protocol (IP) addresses through which each data protection appliance can be reached; receiving, from a client, a connection request comprising an identification of a particular storage unit which the client seeks to access for a data protection job; looking up the particular storage unit in the stored information to identify a particular data protection appliance on which the particular storage unit currently resides; and returning, to the client, a list comprising multiple IP addresses through which the particular data protection appliance can be reached according to the stored information, wherein the client upon receipt of the list selects an IP address from the list to attempt an initial connection to the particular data protection appliance.

In another embodiment, there is a computer program product, comprising a non-transitory computer-readable medium having a computer-readable program code embodied therein, the computer-readable program code adapted to be executed by one or more processors to implement a method comprising: storing information mapping storage units to a pool of data protection appliances on which the storage units reside, the stored information comprising a plurality of Internet Protocol (IP) addresses through which each data protection appliance can be reached; receiving, from a client, a connection request comprising an identification of a particular storage unit which the client seeks to access for a data protection job; looking up the particular storage unit in the stored information to identify a particular data protection appliance on which the particular storage unit currently resides; and returning, to the client, a list comprising multiple IP addresses through which the particular data protection appliance can be reached according to the stored information, wherein the client upon receipt of the list selects an IP address from the list to attempt an initial connection to the particular data protection appliance.

Figure 9:
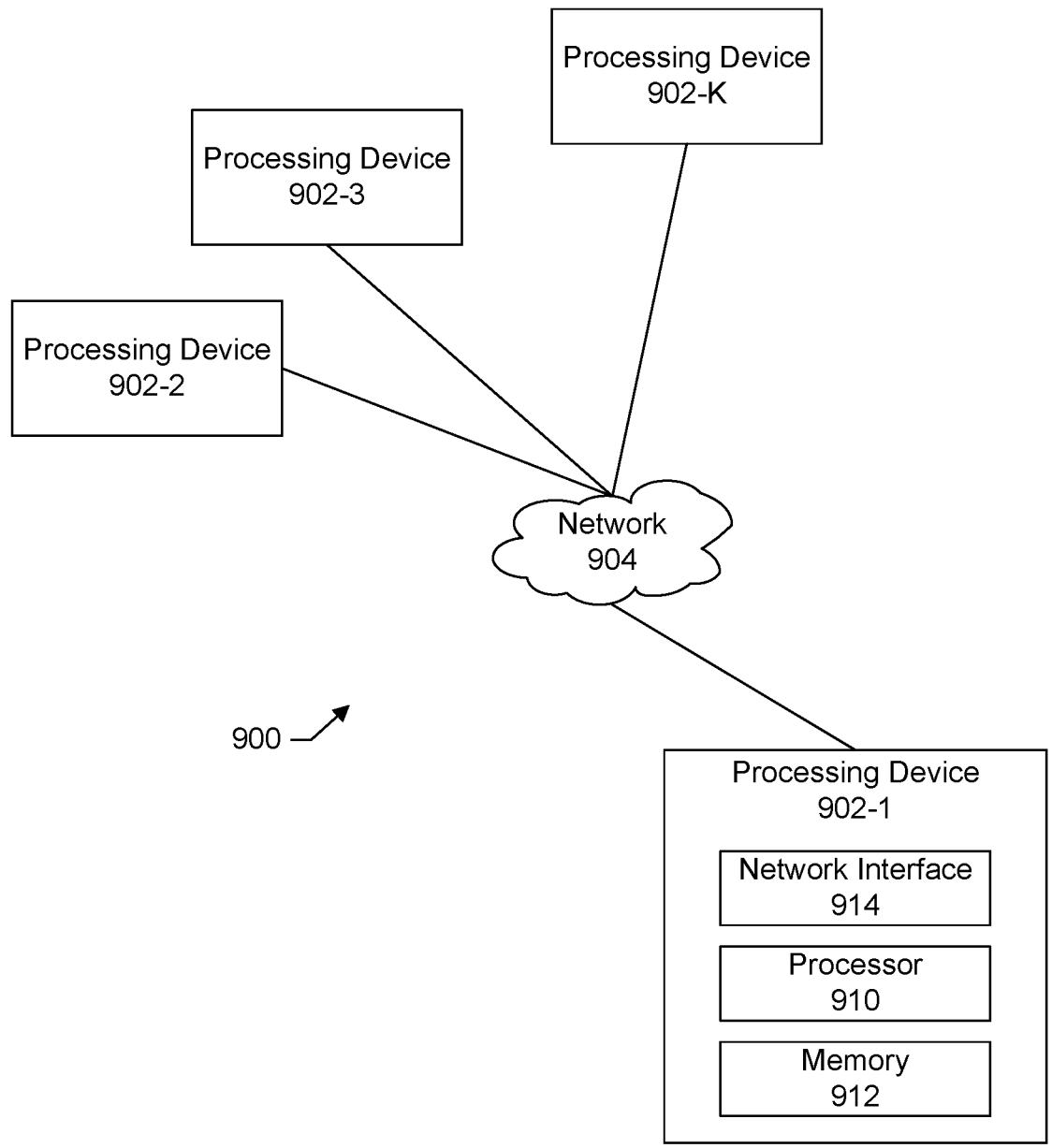
FIG. 9 shows a block diagram of a processing platform that may be utilized to implement at least a portion of an information processing system, according to one or more embodiments.

FIG. 9 shows an example of a processing platform 900 that may include at least a portion of the information handling system shown in FIG. 1. The example shown in FIG. 9 includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 10:
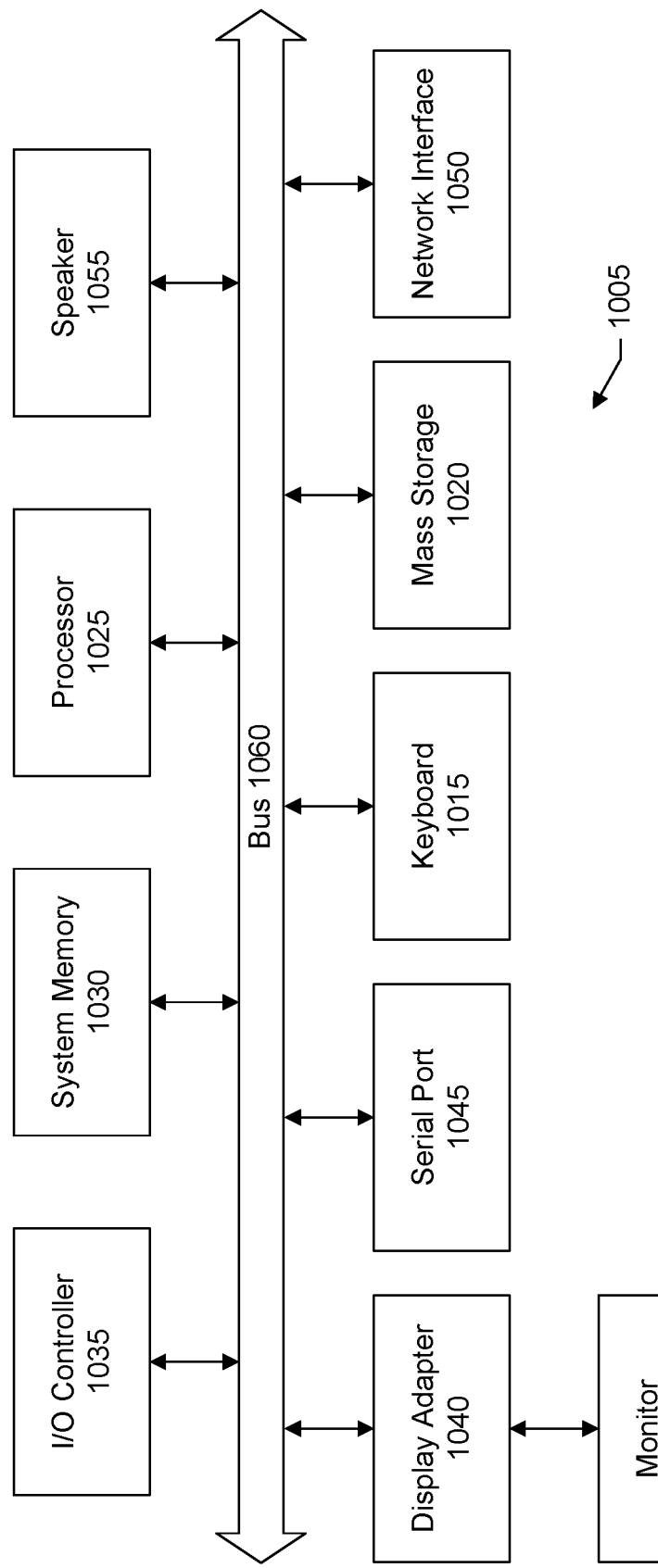
FIG. 10 shows a block diagram of a computer system suitable for use with the system, according to one or more embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
receiving a request from a client to create a particular storage unit at an appliance pool, the appliance pool comprising a plurality of data protection appliances, and the request specifying the appliance pool, but not a particular data protection appliance;
selecting the particular data protection appliance on which to create the particular storage unit and creating the particular storage unit on the particular data protection appliance;
storing, by a namespace redirection service, information mapping storage units to the pool of data protection appliances on which the storage units reside, the stored information including an identification of the particular data protection appliance on which the particular storage unit currently resides, and comprising a plurality of Internet Protocol (IP) addresses through which each data protection appliance can be reached;
receiving, at the namespace redirection service from the client, a remote procedure call (RPC) requesting access to the particular storage unit for a first data protection job, the request comprising an identification of the particular storage unit which the client seeks to access for the first data protection job, but not the particular data protection appliance on which the particular storage unit currently resides, the particular storage unit comprising a logical grouping of backup data of the client;
authenticating, by the namespace redirection service, the request;
after authenticating the request, looking up the particular storage unit in the stored information to identify the particular data protection appliance on which the particular storage unit currently resides, the particular data protection appliance now being a first particular data protection appliance;
load balancing an initial connection by the client to the first particular data protection appliance on which the particular storage unit currently resides by returning, to the client from the namespace redirection service, a list comprising multiple IP addresses through which the first particular data protection appliance can be reached according to the stored information, wherein the client upon receipt of the list selects an IP address from the list to attempt the initial connection to the first particular data protection appliance, and
wherein a further load balancing is performed after the initial connection by the client to the first particular data protection appliance is successful, the further load balancing comprising the client disconnecting from the initial connection to the first particular data protection appliance made using the IP address selected by the client, and reconnecting to the first particular data protection appliance using an IP address provided by the first particular data protection appliance;
tracking, by the namespace redirection service, a location of the particular storage unit including the data protection appliance at which the particular storage unit resides;
receiving, at the namespace redirection service from the client, a request to access the particular storage unit for a second data protection job;
determining that the particular storage unit now resides on a second particular data protection appliance, different from the first particular data protection appliance; and
redirecting the client to the second particular data protection appliance for the second data protection job involving the particular storage unit.

2. The method of claim 1 wherein the selection of the IP address from the list by the client is a random selection.

3. The method of claim 1 wherein the storage unit corresponds to a directory within a file system of the data protection appliance.

4. The method of claim 1 wherein when the initial connection attempt is unsuccessful, the client repeats selecting an IP address from the list until the initial connection attempt is successful.

5. The method of claim 1 wherein upon the initial connection attempt being successful, the client receives a new IP address from the data protection appliance, disconnects from initial connection using the selected IP address, reinitiates a connection to the data protection appliance with the new IP address, and starts the data protection job with the reinitiated connection.

6. The method of claim 1 further comprising:
returning, to the client, network attributes associated with each IP address in the list of IP addresses, the network attributes comprising a link speed and interface type associated with an IP address.

7. The method of claim 1 wherein the RPC from the client to the namespace redirection service requesting access to the particular storage unit comprises an access IP address, wherein the access IP address identifies a subnet to which the client has been configured to have access, and wherein each IP address from the list of multiple IP addresses returned to the client by the namespace redirection service for load balancing the initial connection to the particular data protection appliance is from the subnet.

8. The method of claim 1 wherein the multiple IP addresses in the list returned to the client by the namespace redirection service for loading balancing the initial connection by the client to the particular data protection appliance comprises a network ID having a value of "192", and wherein the client makes a random selection from the list of multiple IP addresses for the initial connection to the particular data protection appliance.

9. The method of claim 1 wherein the IP address selected by the client is a first IP address, the IP address provided by the first particular data protection appliance is a second IP address, and the further load balancing comprises:

after the initial connection to the first particular data protection using the first IP address is successful, sending, by the first particular data protection appliance, the second IP address to the client, wherein the client upon receipt of the second IP address initiates a disconnection from the first particular data protection appliance using the first IP address, and reconnects to the first particular data protection appliance using the second IP address provided by the first particular data protection appliance.

10. The method of claim 1 wherein when the attempt by the client of the initial connection to the first particular data protection appliance using the IP address selected by the client is unsuccessful, the client marks the IP address to prevent the IP address from being selected for a next connection attempt, generates an alert notification, and selects, for the next connection attempt, a different IP address from the list of multiple IP addresses sent to the client by the namespace redirection service.

11. A system comprising: a processor; and memory configured to store one or more sequences of instructions which, when executed by the processor, cause the processor to carry out the steps of:

storing, by a namespace redirection service, information mapping storage units to a pool of data protection appliances on which the storage units reside, the stored information comprising a plurality of Internet Protocol (IP) addresses through which each data protection appliance can be reached;

receiving, at the namespace redirection service from a client, a connection request comprising an identification of a particular storage unit which the client seeks to access for a first data protection job, the particular storage unit comprising a logical grouping of backup data of the client;

authenticating, by the namespace redirection service, the request;

after authenticating the request, looking up the particular storage unit in the stored information to identify a particular data protection appliance on which the particular storage unit currently resides, the particular data protection appliance now being a first particular data protection appliance;

load balancing an initial connection by the client to the first particular data protection appliance on which the particular storage unit currently resides by returning, to the client from the namespace redirection service, a list comprising multiple IP addresses through which the first particular data protection appliance can be reached according to the stored information, wherein the client upon receipt of the list randomly selects an IP address from the list to attempt the initial connection to the first particular data protection appliance, wherein each IP address in the list to be selected by the client comprises a network ID having a value of "192";

tracking, the by namespace redirection service, a location of the particular storage unit including the data protection appliance at which the particular storage unit resides;

receiving, at the namespace redirection service from the client, a request to access the particular storage unit for a second data protection job;

determining that the particular storage unit now resides on a second particular data protection appliance, different from the first particular data protection appliance; and redirecting the client to the second particular data protection appliance for the second data protection job involving the particular storage unit.

12. The system of claim 11 wherein the storage unit corresponds to a directory within a file system of the data protection appliance.

13. The system of claim 11 wherein when the initial connection attempt is unsuccessful, the client repeats selecting an IP address from the list until the initial connection attempt is successful.

14. The system of claim 11 wherein upon the initial connection attempt being successful, the client receives a new IP address from the data protection appliance, disconnects from initial connection using the selected IP address, reinitiates a connection to the data protection appliance with the new IP address, and starts the data protection job with the reinitiated connection.

15. The system of claim 11 wherein the processor further carries out the steps of:

returning, to the client, network attributes associated with each IP address in the list of IP addresses, the network attributes comprising a link speed and interface type associated with an IP address.

16. A computer program product, comprising a non-transitory computer-readable medium having a computer-readable program code embodied therein, the computer-readable program code adapted to be executed by one or more processors to implement a method comprising:

receiving a request from a client to create a particular storage unit at an appliance pool, the appliance pool comprising a plurality of data protection appliances, and the request specifying the appliance pool, but not a particular data protection appliance;

selecting the particular data protection appliance on which to create the particular storage unit and creating the particular storage unit on the particular data protection appliance;

storing, by a namespace redirection service, information mapping storage units to the pool of data protection appliances on which the storage units reside, the stored information including an identification of the particular data protection appliance on which the particular storage unit current resides, and comprising a plurality of Internet Protocol (IP) addresses through which each data protection appliance can be reached;

receiving, at the namespace redirection service from the client, a remote procedure call (RPC) requesting access to the particular storage unit for a first data protection job, the request comprising an identification of the particular storage unit which the client seeks to access for the first data protection job, but not the particular data protection appliance on which the particular storage unit currently resides, the particular storage unit comprising a logical grouping of backup data of the client;

authenticating, by the namespace redirection service, the request;

after authenticating the request, looking up the particular storage unit in the stored information to identify the particular data protection appliance on which the particular storage unit currently resides, the particular data protection appliance now being a first particular data protection appliance;

load balancing an initial connection by the client to the first particular data protection appliance on which the particular storage unit currently resides by returning, to the client from the namespace redirection service, a list comprising multiple IP addresses through which the first particular data protection appliance can be reached according to the stored information, wherein the client upon receipt of the list randomly selects an IP address from the list to attempt the initial connection to the first particular data protection appliance, wherein each IP address in the list to be selected by the client comprises a network ID having a value of "192", and wherein a further load balancing is performed after the initial connection by the client to the first particular data protection appliance is successful, the further load balancing comprising the client disconnecting from the initial connection to the first particular data protection appliance made using the IP address selected by the client, and reconnecting to the first particular data protection appliance using an IP address provided by the first particular data protection appliance;

tracking, by the namespace redirection service, a location of the particular storage unit including the data protection appliance at which the particular storage unit resides;

receiving, at the namespace redirection service from the client, a request to access the particular storage unit for a second data protection job;

determining that the particular storage unit now resides on a second particular data protection appliance, different from the first particular data protection appliance; and redirecting the client to the second particular data protection appliance for the second data protection job involving the particular storage unit.

17. The computer program product of claim 16 wherein the storage unit corresponds to a directory within a file system of the data protection appliance.

18. The computer program product of claim 16 wherein when the initial connection attempt is unsuccessful, the client repeats selecting an IP address from the list until the initial connection attempt is successful.

19. The computer program product of claim 16 wherein upon the initial connection attempt being successful, the client receives a new IP address from the data protection appliance, disconnects from initial connection using the selected IP address, reinitiates a connection to the data protection appliance with the new IP address, and starts the data protection job with the reinitiated connection.

20. The computer program product of claim 16 wherein the method further comprises:

returning, to the client, network attributes associated with each IP address in the list of IP addresses, the network attributes comprising a link speed and interface type associated with an IP address.

* * * * *